(12) United States Patent
Yamaga et al.

(10) Patent No.: US 11,446,984 B2
(45) Date of Patent: Sep. 20, 2022

(54) COOLING SYSTEM AND COOLING METHOD

(71) Applicant: Mazda Motor Corporation, Hiroshima (JP)

(72) Inventors: Yuma Yamaga, Aki-gun (JP); Yusuke Koike, Aki-gun (JP); Takafumi Tanehira, Aki-gun (JP); Yusuke Mikuni, Aki-gun (JP); Kanichi Yamaguchi, Aki-gun (JP); Katsutoshi Taninaka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 95 days.

(21) Appl. No.: 17/158,462

(22) Filed: Jan. 26, 2021

(65) Prior Publication Data

US 2021/0252945 A1 Aug. 19, 2021

(30) Foreign Application Priority Data

Feb. 19, 2020 (JP) .............................. JP2020-026032

(51) Int. Cl.
*B60H 1/32* (2006.01)
(52) U.S. Cl.
CPC ................................ *B60H 1/3228* (2019.05)
(58) Field of Classification Search
CPC ............... B60H 1/3228; B60H 1/3205; B60H 1/32284; B60H 1/00328; B60H 1/00664; B60H 2001/3241; B60H 2001/3248; B60H 2001/3255
See application file for complete search history.

(56) References Cited

U.S. PATENT DOCUMENTS

| | | | |
|---|---|---|---|
| 2015/0343894 A1 | 12/2015 | Yoshioka | |
| 2017/0321597 A1* | 11/2017 | Michikawauchi | ........ F01P 3/20 |
| 2020/0171917 A1* | 6/2020 | Kim | ................... B60H 1/00042 |
| 2021/0254538 A1* | 8/2021 | Yamaga | .................... F01P 7/14 |
| 2021/0254540 A1* | 8/2021 | Yamaga | .................... F01P 3/18 |

FOREIGN PATENT DOCUMENTS

JP 2015223905 A 12/2015

* cited by examiner

*Primary Examiner* — Marc E Norman
(74) *Attorney, Agent, or Firm* — Alleman Hall Creasman & Tuttle LLP

(57) ABSTRACT

A cooling system is provided to cool fluid used in a device mounted on a vehicle, by exchanging heat with cooler cooling water in a cooler. The system includes a cooling water passage connected to the cooler and having an undercover cooling water passage provided to an undercover, a cooler radiator configured to cool the cooler cooling water by exchanging heat between the cooler cooling water and air flowing into an engine bay from a grille, a flow rate adjuster configured to adjust a flow rate of the cooler cooling water supplied the undercover cooling water passage, and a controller configured to acquire at least a pressure or a temperature of the fluid, and control the flow rate adjuster to increase the flow rate of the cooler cooling water supplied to the undercover cooling water passage based on an increase in the pressure or the temperature of the fluid.

6 Claims, 6 Drawing Sheets

COOLING SYSTEM AND COOLING METHOD

TECHNICAL FIELD

The present disclosure relates to a cooling system which cools fluid that is used in a device mounted on a vehicle, and a method of cooling fluid that is used in a device mounted on a vehicle.

BACKGROUND OF THE DISCLOSURE

Air flows into an engine bay from a grille of a vehicle as the vehicle travels. Although this air can be used to cool various elements of the engine bay, it acts as resistance in traveling of the vehicle and fuel efficiency degrades. For example, JP2015-223905A discloses a grille shutter provided to a grille of a vehicle. When a given condition is met, the grille shutter closes the grille to prevent air from flowing therein and reduce air resistance to the vehicle.

When the grille is enlarged, a flow rate of air into the engine bay is increased, which enhances an effect of cooling the elements of the engine bay described above; however, it leaves a challenge in that the air resistance increases. Recently, achieving a high performance in both cooling the elements of the engine bay and reducing the air resistance has been demanded.

SUMMARY OF THE DISCLOSURE

The present disclosure is made in view of the above situation, and one purpose thereof is to provide a cooling system and a cooling method, which effectively cool a fluid used in a device mounted on a vehicle, without enlarging a grille of a vehicle.

According to one aspect of the present disclosure, a cooling system is provided to cool a fluid used in a device mounted on a vehicle, by exchanging heat with cooler cooling water in a cooler. The cooling system includes a cooling water passage connected to the cooler and having an undercover cooling water passage provided to an undercover forming a bottom surface of the vehicle and where the cooler cooling water is cooled by exchanging heat between the cooler cooling water and air below the undercover, a cooler radiator provided in the cooling water passage and configured to cool the cooler cooling water by exchanging heat between the cooler cooling water and air flowing into an engine bay from a grille that is an opening portion formed at a front end of the vehicle, a flow rate adjuster including a pump or valve, configured to adjust a flow rate of the cooler cooling water supplied to the undercover cooling water passage, and a controller configured to control the flow rate adjuster, the controller acquiring at least one of a pressure and a temperature of the fluid, and controlling the flow rate adjuster to increase the flow rate of the cooler cooling water supplied to the undercover cooling water passage based on an increase in one of the pressure and the temperature of the fluid.

According to this configuration, without increasing the size of the grille of the vehicle, the fluid (e.g., coolant, compressed air, cooling water) used in the device mounted on the vehicle (e.g., an air conditioner, a forced induction system, a cooling device for electrical components) is effectively cooled. Hereinafter, this point will be described in detail.

The fluid used in the device mounted on the vehicle is cooled by exchanging heat with the cooler cooling water in the cooler. In order to cool this cooler cooling water, the configuration described above includes the undercover cooling water passage and the cooler radiator. The undercover cooling water passage is provided to the undercover, and cools the cooler cooling water by exchanging heat between the cooler cooling water and air below the undercover.

Moreover, the controller controls the flow rate adjuster to increase the flow rate of the cooler cooling water supplied to the undercover cooling water passage based on the increase in one of the pressure and the temperature of the fluid. Therefore, without increasing the size of the grille of the vehicle, the cooling of the cooler cooling water in the undercover cooling water passage is stimulated in response to the increasing need for cooling the fluid, and the fluid is effectively cooled.

The cooling system may further include a grille shutter provided to the grille and configured to change an effective opening area of the grille. The controller may acquire a traveling speed of the vehicle and, when the traveling speed is above a given speed threshold, control the grille shutter to close the grille. Since air flows below the undercover at a high speed when the vehicle travels at a high speed, the heat exchange between the cooler cooling water and the air in the undercover cooling water passage is stimulated. According to this configuration, when the vehicle travels at a high speed, the grille is closed to reduce the air resistance, while effectively cooling the cooler cooling water.

The cooling water passage may have a bypass passage connecting a branching portion disposed upstream of the cooler radiator and downstream of the undercover cooling water passage, to a merging portion disposed downstream of the cooler radiator and upstream of the cooler. The flow rate adjuster may include the valve which is configured to open and close the cooling water passage between the branching portion and the cooler radiator. When the acquired traveling speed is above the speed threshold, the controller may control the valve to close the cooling water passage between the branching portion and the cooler radiator.

According to this configuration, when the vehicle travels at a high speed, the cooler cooling water is circulated using the bypass passage without supplying the cooler cooling water to the cooler radiator. Thus, the resistance received by the cooler cooling water is reduced compared to the case where the cooler cooling water is supplied to the cooler radiator, the flow rate of the cooler cooling water to be supplied to the undercover cooling water passage is increased, and the cooling of the cooler cooling water in the undercover cooling water passage is stimulated. As a result, the need to cool the cooler cooling water using the cooler radiator is decreased, and therefore the grille is closed to further reduce the air resistance.

The undercover cooling water passage may cool the cooler cooling water by exchanging heat between the cooler cooling water and air flowing into the engine bay from the grille and reaching above the undercover. The vehicle may include an engine radiator configured to cool engine cooling water that cools the engine of the vehicle by exchanging heat between the engine cooling water and the air flowing into the engine bay from the grille. The cooling system may also include a flap configured to open and close a path of air from the engine radiator to the undercover. The controller may control the flap to close the path when a temperature of the engine cooling water supplied to the engine radiator is above a given temperature threshold.

According to this configuration, in addition to the heat exchange with the air below the undercover, the heat exchange with the air flowing into the engine bay from the grille and reaching above the undercover effectively cool the cooler cooling water. However, when the air that reached above the undercover has a high temperature due to passing through the engine radiator, the cooling of the cooler cooling water in the undercover cooling water passage may be hindered by the hot air. For this, the cooling system also includes the flap which opens and closes the air path from the engine radiator to the undercover. When the temperature of the engine cooling water supplied to the engine radiator is above the temperature threshold, the temperature of the air passing through the engine radiator also rises, and in this case, the flap closes the path. Thus, the cooling of the cooler cooling water is prevented from being hindered by hot air.

The temperature threshold may be determined based on a temperature of the cooler cooling water supplied to the undercover cooling water passage. When the temperature of the cooler cooling water flowing through the undercover cooling water passage is below the temperature of the air passed through the engine radiator, cooling of the cooler cooling water in the undercover cooling water passage may be hindered by the hot-temperature air. Therefore, in the above configuration, the temperature threshold is determined based on the temperature of the cooler cooling water supplied to the undercover cooling water passage. By controlling the flap based on such a temperature threshold, cooling of the cooler cooling water in the undercover cooling water passage is stimulated while preventing the cooling of the cooler cooling water from being hindered by hot air.

According to another aspect of the present disclosure, a method of cooling a fluid used in a device mounted on a vehicle is provided. The vehicle is mounted thereon with a cooling system having a cooling water passage where cooling water circulates and having an undercover cooling water passage provided to an undercover forming a bottom surface of the vehicle and where the cooling water is cooled by exchanging heat between the cooling water and air below the undercover, a radiator provided in the cooling water passage and configured to cool the cooling water by exchanging heat between the cooling water and air flowing into an engine bay from a grille that is an opening portion formed at a front end of the vehicle, and a cooler provided in the cooling water passage and configured to cool the fluid by exchanging heat between the cooling water and the fluid. The method includes acquiring at least one of a pressure and a temperature of the fluid, and increasing a flow rate of cooling water supplied to the undercover cooling water passage based on the acquired one of the pressure and the temperature of the fluid.

DETAILED DESCRIPTION OF THE DISCLOSURE

Hereinafter, cooling systems 1 and 1A according to embodiments will be described with reference to the accompanying drawings.

First Embodiment

Vehicle

Figure 1:
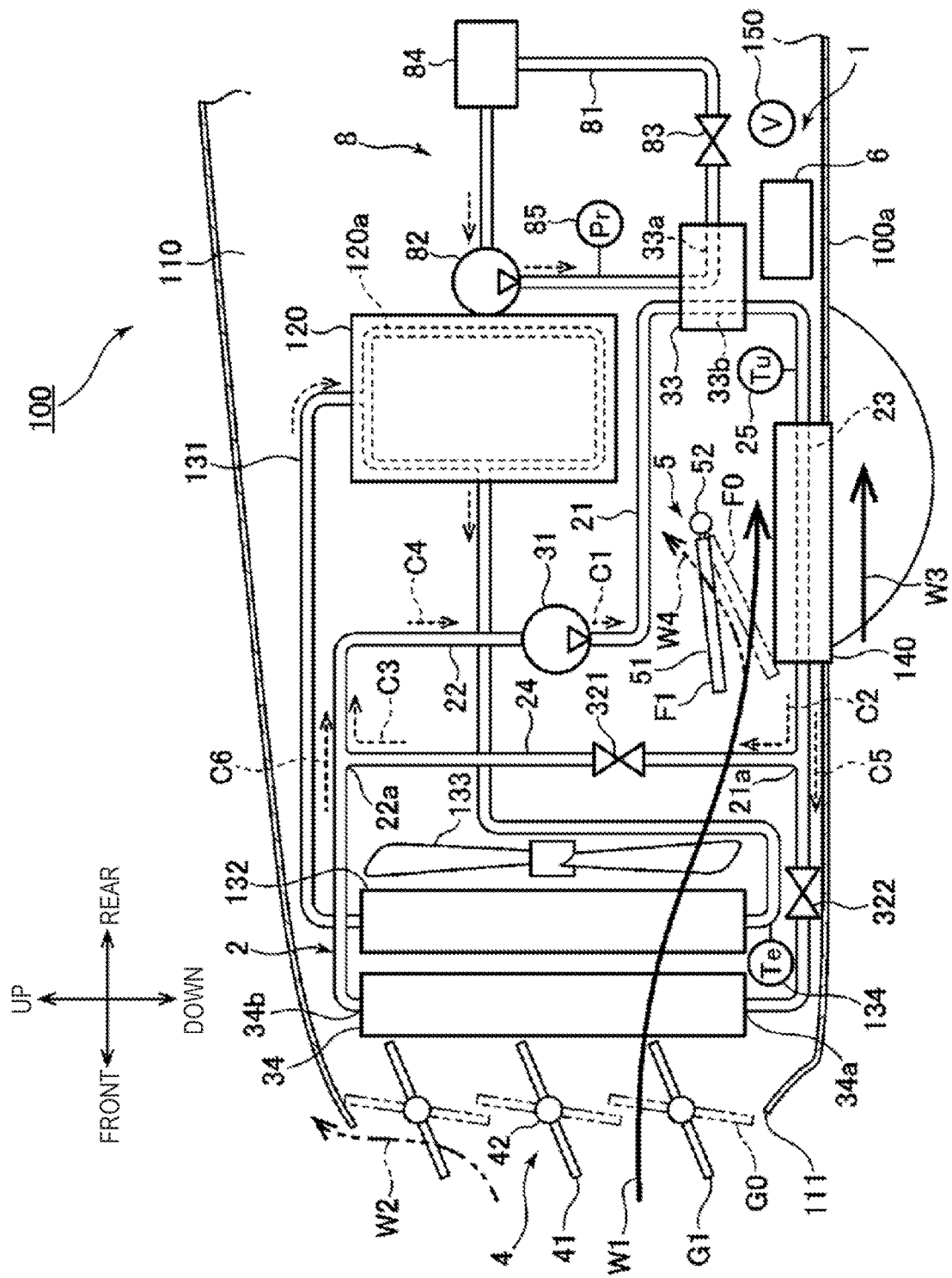
FIG. 1 is a schematic view of a vehicle on which a cooling system according to a first embodiment is mounted.

First, a vehicle 100 equipped with the cooling system 1 according to the first embodiment will be described with reference to FIG. 1. FIG. 1 is a schematic view of the vehicle 100 on which the cooling system 1 is mounted. An engine bay 110 accommodating an engine 120 is formed in a front part of the vehicle 100. An undercover 140 is disposed below the engine 120. The undercover 140 is made of a metal material having a high thermal conductivity (e.g., aluminum). The undercover 140 covers a lower part of the engine bay 110 and forms at least a part of a bottom surface 100a of the vehicle 100.

Here, a direction to which the vehicle 100 travels forward is referred to as "front" and a direction to which the vehicle 100 travels backward is referred to as "rear." Moreover, a vertically upward direction is referred to as "up" and a vertically downward direction is referred to as "down."

The engine 120 is an internal combustion engine in which a drive force of the vehicle 100 is generated. A cooling water passage 131, a radiator 132, and a radiator fan 133 are disposed in the engine bay 110 as elements for cooling the engine 120. The cooling water passage 131 has a water jacket 120a formed in the engine 120 and circulates cooling water. The radiator 132 is one example of an "engine radiator" according to the present disclosure. The cooling water flowing through the cooling water passage 131 is one example of an "engine cooling water" according to the present disclosure.

The cooling water cools the engine 120 by exchanging heat with the engine 120 when passing through the water jacket 120a. High-temperature cooling water that passed through the water jacket 120a is supplied to the radiator 132 provided in the cooling water passage 131. The radiator 132 has a flat shape and is formed therein with a passage through which the cooling water flows. Further, the radiator 132 is disposed so that its thickness direction is in parallel to the front-and-rear direction. A temperature Te of the cooling water supplied to the radiator 132 by the cooling water passage 131 is detected by a temperature sensor 134.

As the vehicle 100 travels and the radiator fan 133 operates, air flows into the engine bay 110 from a grille 111 as indicated by the arrow W1 in FIG. 1. The air passes through a radiator 34 (described later) and then passes through the radiator 132 in its thickness direction. The cooling water flowing inside the radiator 132 is cooled by exchanging heat with this air. The cooling water that passed through the radiator 132 is supplied to the water jacket 120a formed in the engine 120 by the cooling water passage 131 again, and is used for cooling the engine 120. Here, the grille 111 is an opening portion formed at a front end of the vehicle 100 to allow air to flow into the engine bay 110.

Air Conditioner

The vehicle 100 is mounted thereon with an air conditioner 8 which operates using a coolant. The air conditioner 8 is one example of a "device mounted on a vehicle" and the coolant is one example of "fluid used in the device" according to the present disclosure.

The air conditioner 8 is provided to adjust a temperature of a cabin of the vehicle 100. A person on the vehicle 100 controls a switch (not illustrated) provided in the cabin, to instruct the air conditioner 8 to start/stop its operation, and/or set a target value of the temperature in the cabin.

The air conditioner 8 includes a coolant passage 81 through which a coolant circulates. The coolant passage 81 is provided with a compressor 82, a condenser 33, an expansion valve 83, and an evaporator 84. The compressor 82 operates by receiving a portion of an output of the engine 120 so as to compress the coolant in a gas phase and discharge downstream. The coolant converts to a liquid phase when compressed by the compressor 82, and rises in temperature and pressure. The pressure of the coolant discharged from the compressor 82 is detected by a pressure sensor 85 disposed downstream of the compressor 82.

The liquid-phase coolant discharged from the compressor 82 is then supplied to the condenser 33. The condenser 33 is also a part of the cooling system 1 as described later (i.e., the condenser 33 is shared by the cooling system 1 and the air conditioner 8). A passage 33a through which the coolant flows and a passage 33b through which the cooling water flows are formed in the condenser 33. The liquid-phase coolant supplied from the compressor 82 is cooled when flowing through the passage 33a by exchanging heat with the cooling water flowing through the passage 33b.

The coolant that passed through the condenser 33 is then supplied to the expansion valve 83. The coolant expands at the expansion valve 83 and decreases in temperature.

The coolant passed through the expansion valve 83 is then supplied to the evaporator 84. A passage through which the coolant flows is formed inside the evaporator 84. While the coolant flows through this passage, it evaporates by exchanging heat with the air flowing on an outer surface of the evaporator 84. That is, the air flowing on the outer surface of the evaporator 84 is cooled by exchanging heat. The gas-phase coolant discharged from the passage formed in the evaporator 84 is supplied again to the compressor 82 by the coolant passage 81. The cooled air while flowing on the outer surface of the evaporator 84 is supplied to the cabin of the vehicle 100 through a duct (not illustrated).

Cooling System Configuration

The cooling system 1 is mounted on the vehicle 100 to cool the coolant used in the air conditioner 8. For example, the cooling system 1 supplies the cooling water at a lower temperature than that of the coolant to the condenser 33 so that the coolant is appropriately cooled in the condenser 33.

Figure 2:
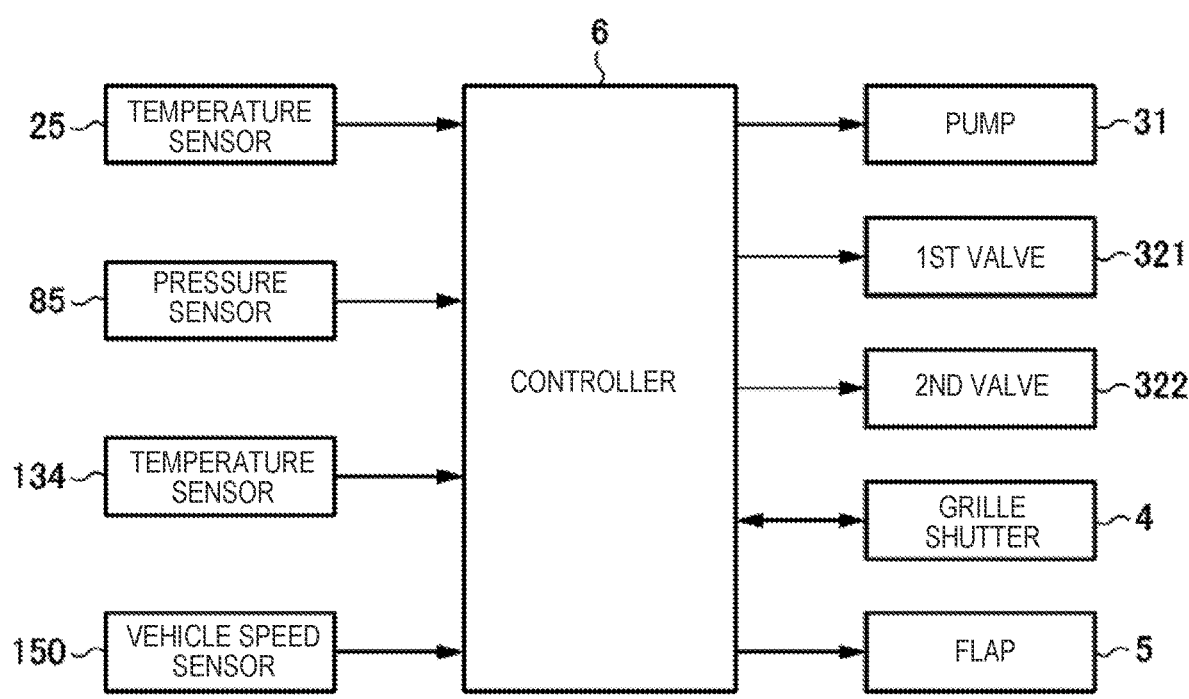
FIG. 2 is a block diagram illustrating a controller.

The configuration of the cooling system 1 is described with reference to FIGS. 1 and 2. FIG. 2 is a block diagram illustrating a controller 6. As illustrated in FIG. 1, the cooling system 1 includes a cooling water passage 2, a grille shutter 4, a flap 5, and the controller 6. Further, the cooling system 1 includes a pump 31 provided in the cooling water passage 2, a first valve 321, a second valve 322, the condenser 33, and the radiator 34.

The cooling water passage 2 circulates the cooling water. The cooling water flowing through the cooling water passage 2 is one example of a "cooler cooling water" according to the present disclosure.

The cooling water passage 2 has a supply passage 21 and a return passage 22. The supply passage 21 supplies the cooling water discharged by the pump 31 to an inlet 34a of the radiator 34. The return passage 22 returns the cooling water flowing out from an outlet 34b of the radiator 34 to the pump 31.

Further, the cooling water passage 2 has an undercover cooling water passage 23 and a bypass passage 24. The undercover cooling water passage 23 is a portion of the supply passage 21 and is formed inside the undercover 140. The bypass passage 24 connects a branching portion 21a provided in the supply passage 21 at a position downstream of the undercover cooling water passage 23, to a merging portion 22a provided in the return passage 22. That is, the bypass passage 24 bypasses the radiator 34 and allows the cooling water to flow from the supply passage 21 to the return passage 22.

The pump 31, the first valve 321 and the second valve 322 are one example of a "flow rate adjuster" according to the present disclosure. Further, the second valve 322 is one example of a "valve" according to the present disclosure. The pump 31 operates based on a control signal, to pressurize the cooling water and to discharge it downstream. A discharge pressure of the pump 31 is adjustable by changing the control signal. Each of the first and second valves 321 and 32 is an electromagnetic valve which is open when receiving no control signal and closed when receiving the control signal. The first valve 321 is provided in the bypass passage 24, and the second valve 322 is provided in the supply passage 21 at a position downstream of the branching portion 21a.

The condenser 33 is one example of a "cooler" according to the present disclosure. As described above, the passages 33a and 33b are formed in the condenser 33. The condenser 33 is disposed so that the coolant flowing through the coolant passage 81 of the air conditioner 8 flows to the passage 33a and the cooling water supplied from the pump 31 flows to the passage 33b.

A temperature sensor 25 is disposed at a position downstream of the condenser 33 and upstream of the undercover cooling water passage 23. The temperature sensor 25 detects a temperature Tu of the cooling water. The temperature sensor 25 is disposed near the undercover cooling water passage 23.

The radiator 34 is one example of a "cooler radiator" according to the present disclosure. The radiator 34 has a flat shape and is disposed forward of the radiator 132 (engine radiator) so that its thickness direction is in parallel to the front-and-rear direction. A passage is formed inside the radiator 34 and the cooling water flows into the passage from the inlet 34a as well as flows out from the outlet 34b.

The grille shutter 4 changes an effective opening area of the grille 111 by changing its opening, and has a plurality of shutter plates 41 and shutter shafts 42. Each of the shutter plates 41 is supported by a corresponding shutter shaft 42 to be swingable between a fully closed position G0 and a fully open position G1. By changing the opening of the grille shutter 4 and changing the effective opening area of the grille 111, a flow rate of the air flowing into the engine bay 110 is changed.

The grille shutter 4 also includes a control unit (not illustrated), a motor (not illustrated), and a link mechanism (not illustrated). The control unit receives a request signal and sets a target position of the shutter plate 41 based on the request signal. Then, the control unit generates a control signal based on the target position and transmits this control signal to the motor.

The motor is a brushless motor. The motor generates a torque based on the control signal received from the control unit and swings one of the plurality of shutter plates 41 with respect to the shutter shaft 42.

The swing movement of the one shutter plate 41 is transmitted to the other shutter plates 41 via the link mechanism. As a result, all the shutter plates 41 are swung in the same direction between the fully closed position G0 and the fully open position G1 and stopped at any position between the fully closed position G0 and the fully open position G1. When the shutter plate 41 is located at the fully closed position G0, a gap between adjacent shutter plates 41 becomes the smallest size, and the effective opening area of the grille 111 becomes the smallest area. When the shutter plate 41 is located at the fully open position G1, the gap between the adjacent shutter plates 41 becomes the largest size, and the effective opening area of the grille 111 becomes the largest area.

The flap 5 opens and closes an air path from the radiator 132 to the undercover 140, and has at least one flap plate 51 and an actuator (not illustrated). The flap plate 51 is supported by a flap shaft 52. When the actuator is driven based on a control signal, the flap plate 51 swings with respect to the flap shaft 52. The flap plate 51 swings between a fully closed position F0 where the air path from the radiator 132 to the undercover 140 is closed and a fully open position F1 where the air path is open.

The controller 6 is an electronic control unit including a processor, memory, etc. As illustrated in FIG. 2, the controller 6 receives detection signals from the temperature sensor 25, the pressure sensor 85, the temperature sensor 134, a vehicle speed sensor 150, and the control unit (not illustrated) of the grille shutter 4. The controller 6 performs given calculations based on the respective detection signals to acquire information, such as the temperature Tu of the cooling water at the position upstream of the undercover cooling water passage 23, a pressure Pr of the coolant at the position downstream of the compressor 82, the temperature Te of the cooling water supplied to the radiator 132, a traveling speed V of the vehicle 100, and whether the grille shutter 4 is in an abnormal state.

The controller 6 performs a given calculation based on the acquired information to generate the control signal and the request signal. The controller 6 controls the respective elements by transmitting the control signal and the request signal to the pump 31, the first valve 321, the second valve 322, the grille shutter 4, and the flap 5.

Operation of Cooling System

Figure 3:
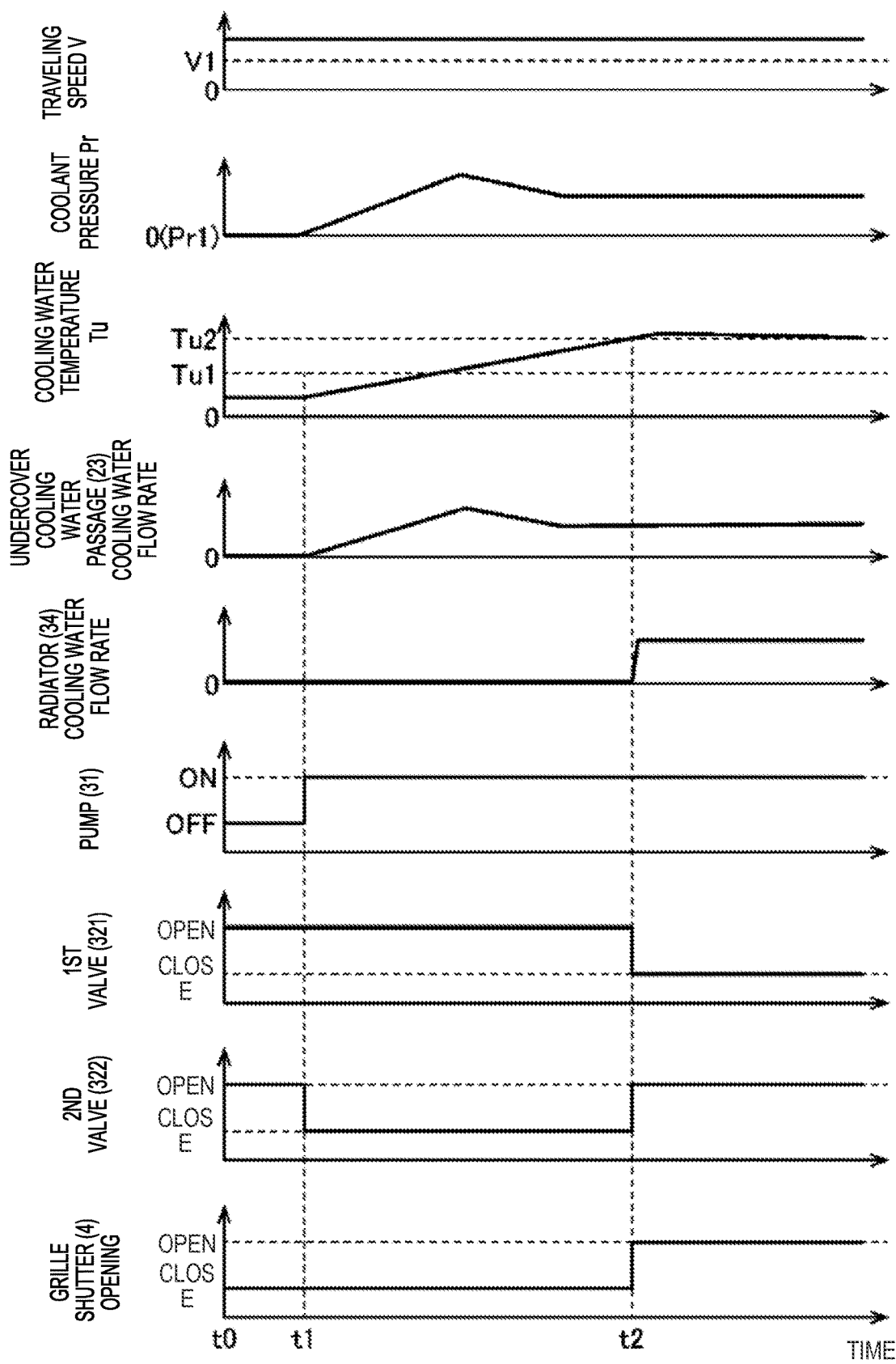
FIG. 3 is a time chart schematically illustrating an operation of the cooling system.

Next, one example of the operation of the cooling system 1 is described with reference to FIGS. 1 and 3. FIG. 3 is a time chart schematically illustrating the operation of the cooling system 1.

FIG. 3 illustrates a state after the traveling speed V of the vehicle 100 becomes constant at a value above a threshold V1 within a short period of time (e.g., one minute) from the start of the engine 120. Here, the threshold V1 is one example of a "speed threshold" according to the present disclosure.

The air conditioner 8 does not operate from a time point t0 to a time point t1. Therefore, the pressure Pr of the coolant used by the air conditioner 8 is zero. The pump 31 of the cooling system 1 does not operate here. Therefore, the flow rate of the cooling water in each of the undercover cooling water passage 23 and the radiator 34 is also zero. The controller 6 acquires the pressure Pr of the coolant used in the air conditioner 8 based on the detection signal received from the pressure sensor 85, and monitors a change thereof.

Further, since the controller 6 does not transmit control signals to the first valve 321 and the second valve 322, the first valve 321 and the second valve 322 are open.

Here it is assumed that the air conditioner 8 receives an operation start instruction from the person on the vehicle 100 and the compressor 82 starts to operate at the time point t1. As a result, the pressure Pr of the coolant at a position downstream of the compressor 82 starts to increase.

The pump 31 starts to operate upon the pressure Pr of the coolant increasing above zero. Further, the second valve 322 shifts to a closed state while the first valve 321 remains in an open state. As a result, the cooling water is supplied from the branching portion 21a to the bypass passage 24, while the supply of the cooling water from the branching portion 21a to the radiator 34 is prohibited. That is, as illustrated by arrows C1, C2, C3, and C4 in FIG. 1, the cooling water discharged from the pump 31 circulates in a path bypassing the radiator 34.

Further, the shutter plate 41 of the grille shutter 4 is disposed at the fully closed position G0. Thus, as illustrated by an arrow W2 in FIG. 1, the flow of air from the grille 111 to the engine bay 110 is blocked by the shutter plates 41. As a result, it becomes possible to reduce air resistance which the vehicle 100 receives while traveling.

The cooling water discharged from the pump 31 is first supplied to the condenser 33 and flows through the passage 33b in the condenser 33. When the cooling water flows through the passage 33b, it cools the coolant by exchanging heat with the passage 33a which is the other passage in the condenser 33. That is, the cooling water absorbs heat by passing through the condenser 33 and rises in temperature.

The cooling water passed through the condenser 33 is then supplied to the undercover cooling water passage 23. When the cooling water flows through the undercover cooling water passage 23, it is cooled by exchanging heat with the air below the undercover 140. In detail, as indicated by an arrow W3, the cooling water flowing through the undercover cooling water passage 23 exchanges heat with the air flowing below the undercover 140, through the undercover 140. Here, the undercover 140 functions as a heat radiating plate which dissipates heat from the cooling water to the air.

As described above, from the time point t1, the cooling system 1 supplies the cooling water increased in temperature after passing through the condenser 33, to the undercover cooling water passage 23 without supplying it to the radiator 34, and cools the cooling water in the undercover cooling water passage 23. While the temperature of the cooling water is relatively low, the grille 111 is closed to reduce the air resistance, while the cooling water is sufficiently cooled by exchanging heat with the air flowing below the undercover 140.

At a time point t2, when the temperature Tu of the cooling water supplied to the undercover cooling water passage 23 exceeds a given threshold Tu2, the first valve 321 shifts to the closed state and the second valve 322 shifts to the open state. Thus, the supply of the cooling water from the branching portion 21a to the bypass passage 24 is prohibited, while the supply of the cooling water from the branching portion 21a to the radiator 34 becomes available. That is, as illustrated by the arrows C1, C5, C6, and C4 in FIG. 1, the cooling water discharged from the pump 31 circulates in a path passing through the radiator 34.

Further, the grille shutter 4 opens the grille 111. The effective opening area of the grille 111 at this time point is determined based on the temperature Tu of the cooling water supplied to the undercover cooling water passage 23. For example, the effective opening area of the grille 111 becomes larger as the temperature Tu increases.

By opening the grille 111, air flows from the grille 111 into the engine bay 110 as illustrated by the arrow W1 in FIG. 1. The air first passes through the radiator 34 in its thickness direction, and then passes through the radiator 132. The cooling water flowing inside the radiator 34 is cooled by exchanging heat with this air. The cooling water that passed through the radiator 34 is supplied to the pump 31 again by the return passage 22 of the cooling water passage 2.

As indicated by the arrow W1, the air that passed through the radiator 34 and the radiator 132 is supplied above the undercover 140 when the flap plate 51 opens the air path from the radiator 132 to the undercover 140. The cooling water flowing through the undercover cooling water passage 23 is cooled also by exchanging heat with the air reached above the undercover 140. That is, the cooling water flowing through the undercover cooling water passage 23 dissipates heat not only to the air flowing below the undercover 140 but also to the air flowing above the undercover 140.

As described above, from the time point t2, the cooling system 1 operates to cool the cooling water passed through the condenser 33 and of which temperature exceeds the threshold Tu2, by the undercover cooling water passage 23 and the radiator 34.

Here, when the air passed through the radiator 34 and the radiator 132 is high in temperature, the cooling of the cooling water in the undercover cooling water passage 23 may be hindered by the high temperature air. Therefore, in this case, the flap plate 51 may be at the fully closed position F0 to prevent high-temperature air from reaching above the undercover 140, as illustrated by an arrow W4 in FIG. 1.

Processing Executed by Controller

Figure 4:
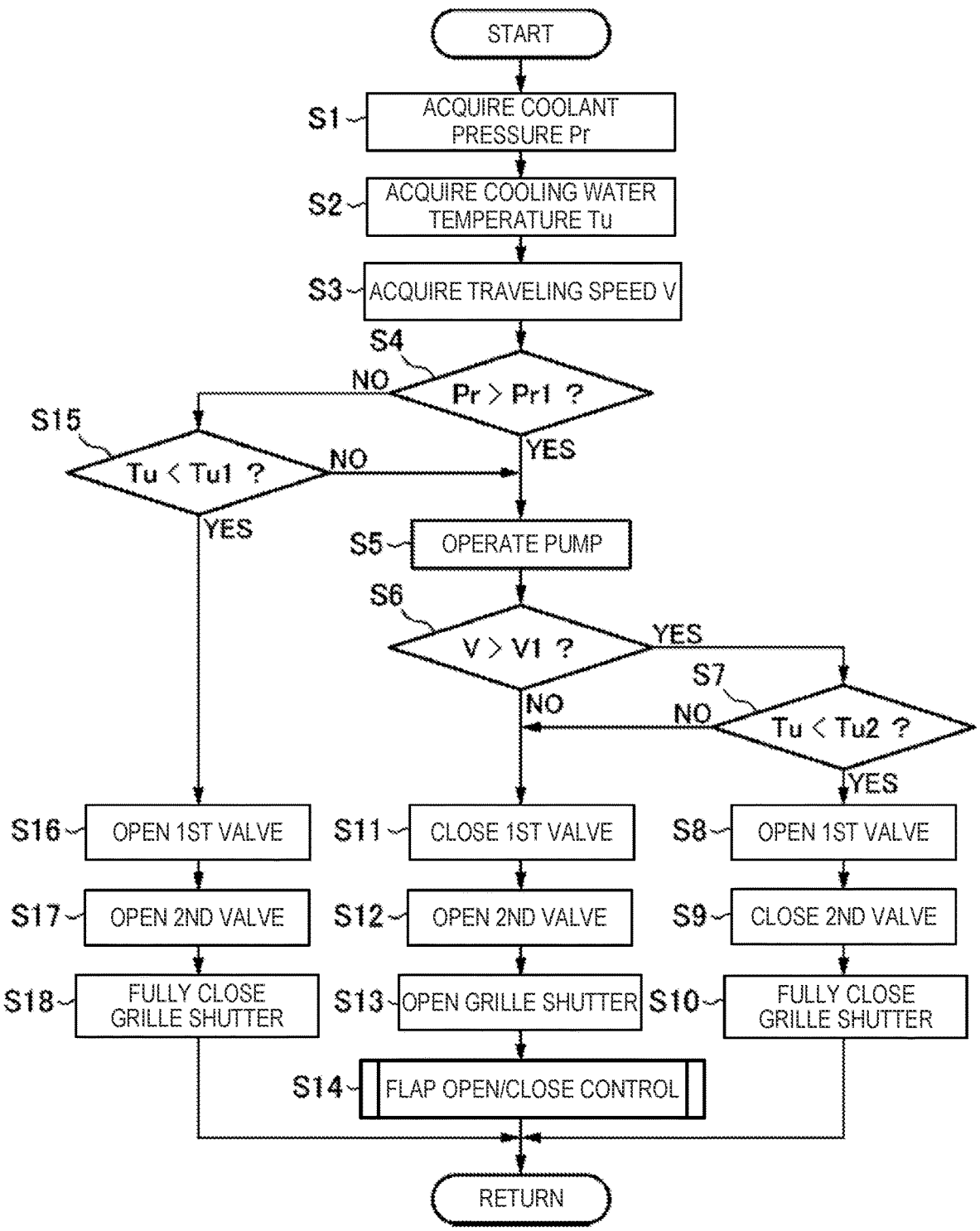
FIG. 4 is a flowchart illustrating processing executed by the controller.
Figure 5:
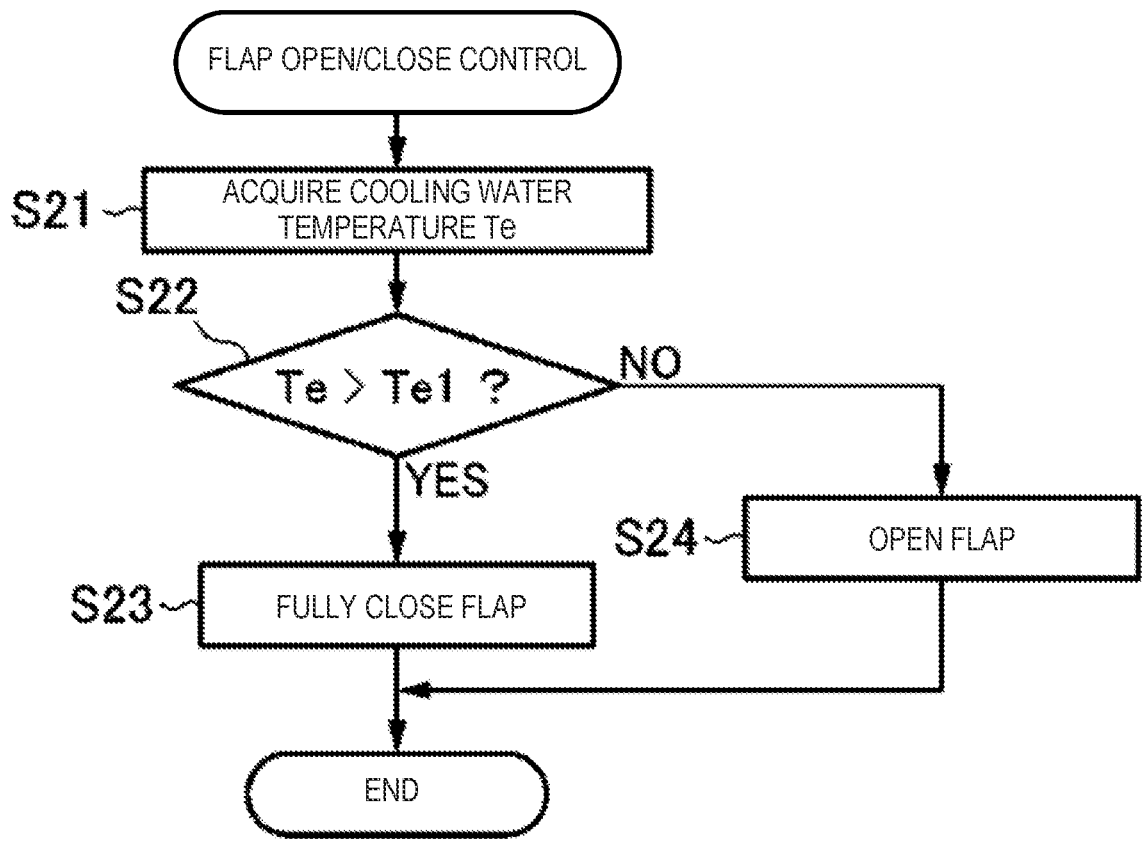
FIG. 5 is a flowchart illustrating processing executed by the controller.

Next, processing executed by the controller 6 is described with reference to FIGS. 1, 4, and 5. FIGS. 4 and 5 are flowcharts illustrating the processing executed by the controller 6.

First, the controller 6 acquires various information based on the detection signal at Steps S1 to S3 illustrated in FIG. 4. For example, at Step S1, the controller 6 acquires the pressure Pr of the coolant at the position downstream of the compressor 82 of the air conditioner 8 based on the detection signal received from the pressure sensor 85. Further, at Step S2, the controller 6 acquires a temperature Tu of the cooling water at a position downstream of the condenser 33 and upstream of the undercover cooling water passage 23, based on the detection signal received from the temperature sensor 25. Moreover, at Step S3, the controller 6 acquires the traveling speed V of the vehicle 100 based on the detection signal received from the vehicle speed sensor 150.

At Step S4, the controller 6 determines whether the pressure Pr of the coolant is above a given threshold Pr1. The threshold Pr1 is a reference value for determining whether the compressor 82 is operated. When the pressure Pr of the coolant is below the threshold Pr1, the compressor 82 of the air conditioner 8 is determined as not operated, and when the pressure Pr rises and exceeds the threshold Pr1, the compressor 82 is determined as operated. Note that in the time chart illustrated in FIG. 3, the threshold Pr1 is set to zero. If determined that the pressure Pr of the coolant is above the threshold Pr1 (Step S4: YES), the controller 6 proceeds to Step S5.

At Step S5, the controller 6 operates the pump 31. Thus, the cooling water is discharged from the pump 31 to the supply passage 21 of the cooling water passage 2.

At Step S6, the controller 6 determines whether the traveling speed V of the vehicle 100 is above a given threshold V1. As described above, the threshold V1 may be referred to as the "speed threshold," and is a reference value for determining an expected cooling performance of the undercover cooling water passage 23. When the traveling speed V is above the threshold V1, air flows below the undercover 140 at a high speed, therefore a relatively high cooling performance is expected from the undercover cooling water passage 23. If determined that the traveling speed V is above the threshold V1 (Step S6: YES), the controller 6 proceeds to Step S7.

At Step S7, the controller 6 determines whether the temperature Tu of the cooling water is below the threshold Tu2. The threshold Tu2 is a reference value for determining whether the temperature of the cooling water is low enough to be cooled simply by the heat exchange with the air flowing below the undercover 140 (i.e., without using the heat exchange in the radiator 34 or the heat exchange with the air reached above the undercover 140). When the temperature Tu is below the threshold Tu2, the cooling water is determined as lower enough to be cooled simply by the heat exchange with the air flowing below the undercover 140. If determined that the temperature Tu is below the threshold Tu2 (Step S7: YES), the controller 6 proceeds to Step S8.

At Step S8, the controller 6 opens the first valve 321 and closes the second valve 322 at Step S9. Further, at Step S10, the controller 6 controls the shutter plates 41 of the grille shutter 4 to be located at the fully closed position G0. Thus, the cooling system 1 operates such that the cooling water is cooled by the heat exchange with the air flowing below the undercover 140 without supplying the cooling water to the radiator 34, as in a period from the time point t1 to the time point t2 illustrated in FIG. 3.

On the other hand, when the traveling speed V of the vehicle 100 is below the threshold V1 or when the temperature Tu of the cooling water is above the threshold Tu2, it is determined that the cooling water is difficult to be sufficiently cooled simply by exchanging the heat with the air flowing below the undercover 140. Therefore, if determined that the traveling speed V is below the threshold V1 (Step S6: NO), or if determined that the temperature Tu of the cooling water is above the threshold Tu2 (Step S7: NO), the controller 6 proceeds to Step S11.

The controller 6 closes the first valve 321 at Step S11 and opens the second valve 322 at Step S12. Further, the controller 6 opens the shutter plates 41 of the grille shutter 4 at Step S13. Here, the controller 6 increases the effective opening area of the grille 111 as the temperature Tu of the cooling water increases. Thus, the cooling system 1 operates to cool the cooling water by exchanging heat with the air flowing below the undercover 140, exchanging heat with air that reached above the undercover 140, and exchanging heat in the radiator 34, as from the time point t2 illustrated in FIG. 3.

Further, at Step S14, the controller 6 executes an open/close control of the flap 5. The open/close control of the flap 5 is described with reference to FIG. 5.

First at Step S21, the controller 6 performs a given calculation based on the detection signal received from the temperature sensor 134, and acquires the temperature Te of the cooling water supplied to the radiator 132.

At Step S22, the controller 6 determines whether the temperature Te is above a given threshold Te1. The threshold Te1 is one example of a "temperature threshold" according to the present disclosure, and is a reference value for determining whether the temperature of the air passing through the radiator 132 becomes high and may hinder the cooling of the cooling water in the undercover cooling water passage 23. Further, the threshold Te1 is determined based on the temperature Tu of the cooling water supplied to the undercover cooling water passage 23, for example, the threshold Te1 increases as the temperature Tu rises. When the temperature Te is above the threshold Te1, the temperature of the air passing through the radiator 132 is relatively high, and the cooling of the cooling water in the undercover cooling water passage 23 may be hindered by the high-temperature air. If determined that the temperature Te is above the threshold Te1 (Step S22: YES), the controller 6 proceeds to Step S23.

At Step S23, the controller 6 controls the flap plate 51 of the flap 5 to be at the fully closed position F0. Thus, as illustrated by the arrow W4 in FIG. 1, the supply of high-temperature air above the undercover 140 is reduced.

On the other hand, when the temperature Te of the cooling water supplied to the radiator 132 is below the threshold Te1, the temperature of the air passing through the radiator 132 is relatively low and this air is determined to stimulate the cooling of the cooling water in the undercover cooling water passage 23. If determined that the temperature Te is below the threshold Te1 (Step S22: NO), the controller 6 proceeds to Step S24. Then at Step S24, the controller 6 opens the flap 5 and supplies the air passed through the radiator 132 to the undercover 140.

The description continues with reference to FIG. 4 again. If determined that the pressure Pr of the coolant is below the threshold Pr1 (Step S4: NO), the controller 6 proceeds to Step S15.

At Step S15, the controller 6 determines whether the temperature Tu of the cooling water supplied to the undercover cooling water passage 23 is below a given threshold Tu1. The threshold Tu1 is lower than the threshold Tu2 described above. When the compressor 82 of the air conditioner 8 does not operate and the temperature Tu of the cooling water is below the threshold Tu1, a need to cool the cooling water is low. Therefore, when determined that the temperature Tu is below the threshold Tu1 (Step S15: YES), the controller 6 proceeds to Step S16.

The controller 6 opens the first valve 321 at Step S16 and opens the second valve 322 at Step S17. Further, the controller 6 controls the shutter plates 41 of the grille shutter 4 to be at the fully closed position G0 at Step S18. Since the pump 31 of the cooling system 1 does not operate and the cooling water does not circulate in the cooling water passage 2, therefore the cooling water is not cooled.

On the other hand, when determined that the temperature Tu supplied to the undercover cooling water passage 23 is above the threshold Tu1 (Step S15: NO), the controller 6 proceeds to Step S5. Then, the controller 6 executes the processing at Step S5 and subsequent flow described above to suitably cool the cooling water in the cooling water passage 2.

Effects

According to the above configuration, the controller 6 controls the pump 31, the first valve 321, and the second valve 322 (which are the flow rate adjuster) so that the flow rate of the cooling water supplied to the undercover cooling water passage 23 increases based on the increase in the pressure Pr of the coolant (fluid). Therefore, without increasing the size of the grille 111 of the vehicle 100, the cooling of the cooling water (cooler cooling water) in the undercover cooling water passage 23 is stimulated in response to the increasing need for cooling the coolant (fluid), and the coolant (fluid) is effectively cooled.

Further, the cooling system 1 includes the grille shutter 4 which is provided in the grille 111 of the vehicle 100 and changes the effective opening area of the grille 111. The controller 6 acquires the traveling speed V of the vehicle 100, and controls the grille shutter 4 to close the grille 111 when the acquired traveling speed V is above the threshold V1 (speed threshold).

Since the air flows below the undercover 140 at a high speed when the vehicle 100 travels at a high speed, the heat exchange between the cooling water (cooler cooling water) and the air in the undercover cooling water passage 23 is stimulated. According to this configuration, when the vehicle 100 travels at a high speed, the grille 111 is closed to reduce the air resistance, while effectively cooling the cooling water (cooler cooling water).

Further, the cooling water passage 2 has the bypass passage 24 connecting the branching portion 21a disposed upstream of the radiator 34 (cooler radiator) and downstream of the undercover cooling water passage 23, to the merging portion 22a disposed downstream of the radiator 34 (cooler radiator) and upstream of the condenser 33 (cooler). The flow rate adjuster has the second valve 322 (valve) which opens and closes the cooling water passage 2 between the branching portion 21a and the radiator 34 (cooler radiator). When the acquired traveling speed V is above the threshold V1 (speed threshold), the controller 6 controls the second valve 322 (valve) to close the cooling water passage 2 between the branching portion 21a and the radiator 34 (cooler radiator).

According to this configuration, when the vehicle 100 travels at a high speed, the cooling water (cooler cooling water) is circulated using the bypass passage 24 without supplying the cooling water (cooler cooling water) to the radiator 34 (cooler radiator). Thus, the resistance received by the cooling water (cooler cooling water) is reduced compared to the case where the cooling water (cooler cooling water) is supplied to the radiator 34 (cooler radiator), the flow rate of the cooling water (cooler cooling water) to be supplied to the undercover cooling water passage 23 is increased, and the cooling of the cooling water (cooler cooling water) in the undercover cooling water passage 23 is stimulated. As a result, the need to cool the cooling water (cooler cooling water) using the radiator 34 (cooler radiator) is decreased, and therefore the grille 111 is closed to further reduce the air resistance.

Further, the undercover cooling water passage 23 cools the cooling water (cooler cooling water) by exchanging heat between the cooling water (cooler cooling water) and the air flowing into the engine bay 110 from the grille 111 of the vehicle 100 and reaching above the undercover 140. The vehicle 100 includes the radiator 132 (engine radiator) which cools the cooling water (engine cooling water) which cools the engine 120 of the vehicle 100 by exchanging heat between the cooling water (engine cooling water) and the air flowing into the engine bay 110 from the grille 111 of the vehicle 100. The cooling system 1 also includes the flap 5 which opens and closes the air path from the radiator 132 (engine radiator) to the undercover 140. The controller 6 controls the flaps 5 to close the path when the temperature Te of the cooling water (engine cooling water) supplied to the radiator 132 (engine radiator) is above the given threshold Te1 (temperature threshold).

According to this configuration, in addition to the heat exchange with the air below the undercover 140, the heat exchange with the air flowing into the engine bay 110 from the grille 111 and reaching above the undercover 140 effectively cools the cooling water (cooler cooling water). However, when the air that reached above the undercover 140 has a high temperature due to passing through the radiator 132 (engine radiator), the cooling of the cooling water (cooler cooling water) in the undercover cooling water passage 23 may be hindered by the hot air.

For this, the cooling system 1 also includes the flap 5 which opens and closes the air path from the radiator 132 (engine radiator) to the undercover 140. When the temperature Te of the cooling water (engine cooling water) supplied to the radiator 132 (engine radiator) is above the threshold Te1 (temperature threshold), the temperature of the air passing through the radiator 132 (engine radiator) also rises. Therefore, the flap 5 closes the path. Thus, the cooling of the cooling water (cooler cooling water) is prevented from being hindered by the high-temperature air.

Further, the threshold Te1 (temperature threshold) is determined based on the temperature Tu of the cooling water (cooler cooling water) supplied to the undercover cooling water passage 23.

When the temperature of the cooling water (cooler cooling water) flowing through the undercover cooling water passage 23 is below the temperature of the air passed through the radiator 132 (engine radiator), cooling of the cooler cooling water in the undercover cooling water passage 23 may be hindered by the hot air.

Therefore, in the cooling system 1, the threshold Te1 (temperature threshold) is determined based on the temperature Tu of the cooling water (cooler cooling water) supplied to the undercover cooling water passage 23. By controlling the flap 5 based on such a threshold Te1 (temperature threshold), cooling of the cooling water (cooler cooling water) in the undercover cooling water passage 23 is stimulated while preventing the cooling the cooling water (cooler cooling water) from being hindered by high-temperature air.

Second Embodiment

Figure 6:
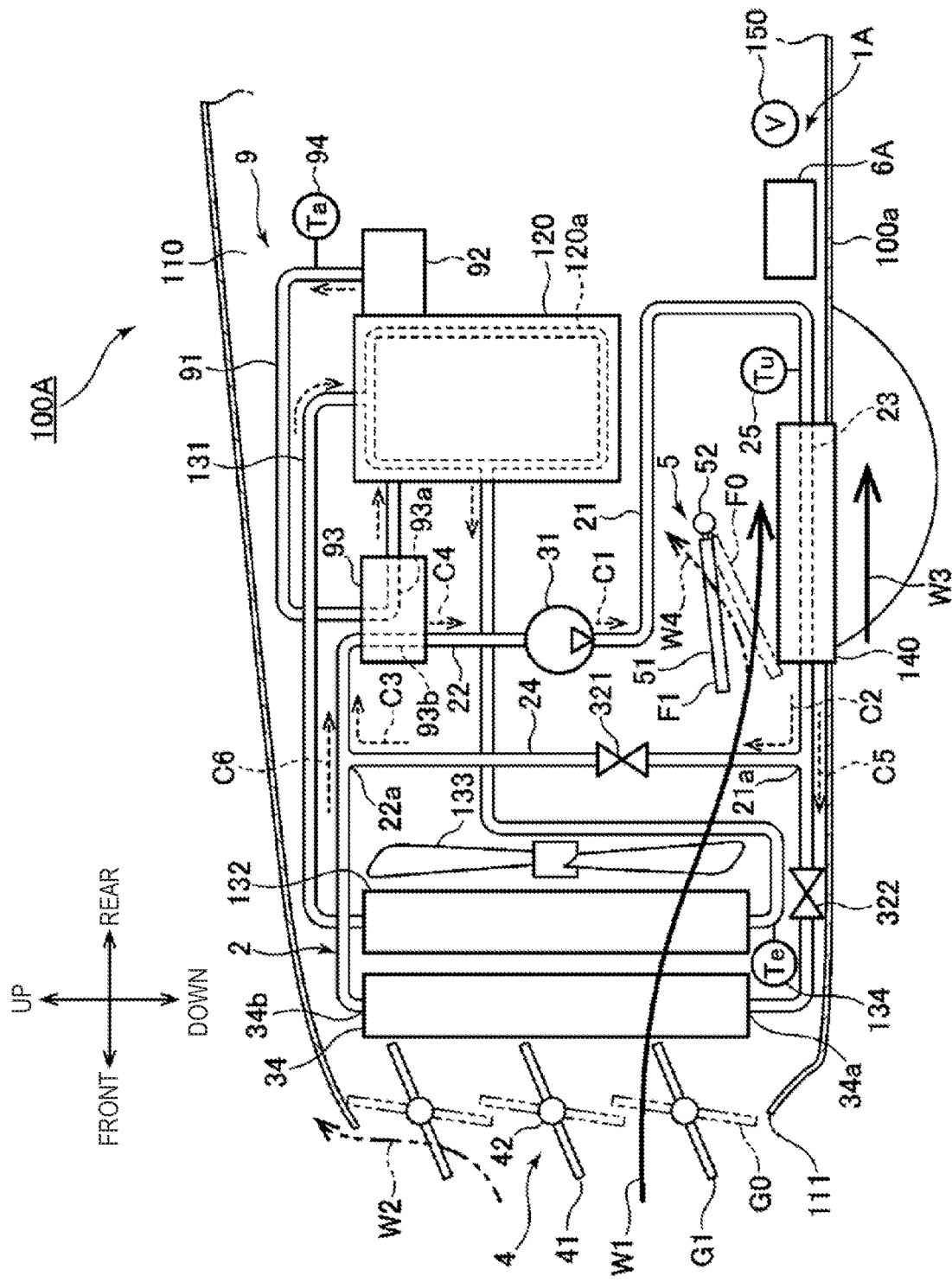
FIG. 6 is a schematic view of a vehicle on which a cooling system according to a second embodiment is mounted.

Next, the cooling system 1A according to a second embodiment is described with reference to FIG. 6. The cooling system 1A cools the air used in a forced induction system 9 mounted on a vehicle 100A. Parts of a configuration of the cooling system 1A having the same components as those of the first embodiment are denoted with the same reference numerals, and the description thereof is suitably omitted. FIG. 6 is a schematic view of the vehicle 100A on which the cooling system 1A is mounted.

Forced Induction System

The vehicle 100A is equipped with the forced induction system 9 which supplies air by compression. The forced induction system 9 is one example of a "device mounted on a vehicle" and the compressed air is one example of a "fluid used in the device" according to the present disclosure.

The forced induction system 9 includes an intake passage 91, a compressor 92, and an intercooler 93. The compressor 92 operates by receiving a portion of an output of an engine 120, and sucks air from an outside thereof to compress it. The air compressed by the compressor 92 flows through the intake passage 91 and is supplied to a combustion chamber (not illustrated) of the engine 120. By being compressed at the compressor 92, the temperature and pressure of the air rise. A temperature Ta of air is detected by a temperature sensor 94 provided downstream of the compressor 92.

The air compressed by the compressor 92 is supplied to the intercooler 93. The intercooler 93 is also a part of the cooling system 1A as described later (i.e., the intercooler 93 is shared between the cooling system 1A and the forced induction system 9). Passages 93a and 93b are formed inside the intercooler 93, and the high-temperature air supplied from the compressor 92 flows only through the passage 93a.

Cooling System Configuration

The cooling system 1A includes the intercooler 93. The intercooler 93 is another example of a "cooler" according to the present disclosure. As described above, the intercooler 93 is disposed such that the high-temperature air supplied from the compressor 92 as described above flows through the passage 93a and cooling water supplied from the radiator 34 flows to the passage 93b. The air is cooled by exchanging heat with the cooling water flowing through the passage 93b, while flowing through the passage 93a.

A controller 6A receives a detection signal from the temperature sensor 25, the temperature sensor 94, the temperature sensor 134, the vehicle speed sensor 150, and the control unit (not illustrated) of the grille shutter 4. The controller 6A performs given calculations based on the respective detection signals to acquire information such as the temperature Tu of the cooling water at the position upstream of the undercover cooling water passage 23, the temperature Ta of the coolant at the position downstream of the compressor 92, the temperature Te of the cooling water supplied to the radiator 132, the traveling speed V of the vehicle 100, and whether the grille shutter 4 is in an abnormal state.

Processing Executed by Controller

Similar to the controller 6 of the first embodiment, the controller 6A controls a flow rate adjuster, the grille shutter 4, and the flap 5 based on the acquired information. In the processing executed by the controller 6 according to the first embodiment, the pressure Pr of the coolant downstream of the compressor 82 is used, whereas in processing executed by the controller 6A according to the second embodiment, the temperature Ta of air downstream of the compressor 92 is used.

Effects

According to this configuration, the controller 6A controls the pump 31, the first valve 321, and the second valve 322 (which are the flow rate adjuster) so that the flow rate of the cooling water supplied to the undercover cooling water passage 23 increases based on the temperature Ta of air (fluid). Therefore, without increasing the size of the grille 111 of the vehicle 100A, the cooling of the cooling water (cooler cooling water) in the undercover cooling water passage 23 is stimulated in response to the increasing demand for cooling air (fluid), and the air (fluid) is effectively cooled.

The above embodiments are for facilitating the understanding of the present disclosure, and are not for limiting the interpretation of the present disclosure. Each element included in each embodiment, its arrangement, material, condition, shape, size, etc. are not limited to those illustratively described, and is suitably changeable.

In the above embodiments, the undercover cooling water passage 23 is formed inside the undercover 140. However, the present disclosure is not limited to this mode. For example, a pipe may be arranged to be in contact with an upper surface of the undercover 140 and a passage in the pipe may be used as the undercover cooling water passage. That is, the undercover cooling water passage may adopt any of various modes as long as its heat is exchangeable with air through the undercover 140.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 1, 1A Cooling System
2 Cooling Water Passage
21a Branching Portion
22a Merging Portion
23 Undercover Cooling Water Passage
24 Bypass Passage
31 Pump (Flow Rate Adjuster)
321 First Valve (Flow Rate Adjuster)
322 Second Valve (Flow Rate Adjuster, Valve)
33 Condenser (Cooler)
34 Radiator (Cooler Radiator)
4 Grille Shutter
5 Flap
6, 6A Controller
8 Air Conditioner (Device)
9 Forced Induction System (Device)
93 Intercooler (Cooler)
100, 100A Vehicle
100a Bottom Surface
110 Engine Bay
111 Grille
120 Engine
132 Radiator (Engine Radiator)
140 Undercover

What is claimed is:

1. A cooling system configured to cool a fluid used in a device mounted on a vehicle, by exchanging heat with cooler cooling water in a cooler, the cooling system comprising:
    a cooling water passage connected to the cooler and having an undercover cooling water passage provided to an undercover forming a bottom surface of the vehicle and where the cooler cooling water is cooled by exchanging heat between the cooler cooling water and air below the undercover;
    a cooler radiator provided in the cooling water passage and configured to cool the cooler cooling water by exchanging heat between the cooler cooling water and air flowing into an engine bay from a grille that is an opening portion formed at a front end of the vehicle;
    a flow rate adjuster including a pump or valve, configured to adjust a flow rate of the cooler cooling water supplied to the undercover cooling water passage; and
    a controller configured to control the flow rate adjuster, the controller acquiring at least one of a pressure and a temperature of the fluid, and controlling the flow rate adjuster to increase the flow rate of the cooler cooling water supplied to the undercover cooling water passage based on an increase in one of the pressure and the temperature of the fluid.

2. The cooling system of claim 1, further comprising a grille shutter provided to the grille and configured to change an effective opening area of the grille,
    wherein the controller acquires a traveling speed of the vehicle and, when the traveling speed is above a given speed threshold, controls the grille shutter to close the grille.

3. The cooling system of claim 2,
    wherein the cooling water passage has a bypass passage connecting a branching portion disposed upstream of the cooler radiator and downstream of the undercover cooling water passage, to a merging portion disposed downstream of the cooler radiator and upstream of the cooler,
    wherein the flow rate adjuster includes the valve which is configured to open and close the cooling water passage between the branching portion and the cooler radiator, and
    wherein, when the acquired traveling speed is above the speed threshold, the controller controls the valve to close the cooling water passage between the branching portion and the cooler radiator.

4. The cooling system of claim 2,
    wherein the undercover cooling water passage cools the cooler cooling water by exchanging heat between the cooler cooling water and air flowing into the engine bay from the grille and reaching above the undercover,
    wherein the vehicle includes an engine radiator configured to cool engine cooling water that cools the engine of the vehicle by exchanging heat between the engine cooling water and the air flowing into the engine bay from the grille,
    wherein the cooling system also includes a flap configured to open and close a path of air from the engine radiator to the undercover, and
    wherein the controller controls the flap to close the path when a temperature of the engine cooling water supplied to the engine radiator is above a given temperature threshold.

5. The cooling system of claim 4, wherein the temperature threshold is determined based on a temperature of the cooler cooling water supplied to the undercover cooling water passage.

6. A method of cooling a fluid used in a device mounted on a vehicle, the vehicle is mounted thereon with a cooling system having a cooling water passage where cooling water circulates and having an undercover cooling water passage provided to an undercover forming a bottom surface of the vehicle, and where the cooling water is cooled by exchanging heat between the cooling water and air below the undercover, a radiator provided in the cooling water passage and configured to cool the cooling water by exchanging heat between the cooling water and air flowing into an engine bay from a grille that is an opening portion formed at a front end of the vehicle, and a cooler provided in the cooling water passage and configured to cool the fluid by exchanging heat between the cooling water and the fluid, the method comprising:
    acquiring at least one of a pressure and a temperature of the fluid; and
    increasing a flow rate of cooling water supplied to the undercover cooling water passage based on the acquired one of the pressure and the temperature of the fluid.

* * * * *